United States Patent [19]

Sakaguchi et al.

[11] Patent Number: 5,579,408

[45] Date of Patent: Nov. 26, 1996

[54] CHARACTER RECOGNITION METHOD AND APPARATUS

[75] Inventors: Katsuhiko Sakaguchi, Kawasaki; Shigeki Mori, Koshigaya; Kazuhiro Matsubayashi, Yokohama; Tsunekazu Arai, Tama, all of Japan

[73] Assignee: Canon Kabushiki Kaisha, Tokyo, Japan

[21] Appl. No.: 384,683

[22] Filed: Feb. 6, 1995

Related U.S. Application Data

[63] Continuation of Ser. No. 976,376, Nov. 13, 1992, abandoned.

[30] Foreign Application Priority Data

Nov. 14, 1991 [JP] Japan .................................. 3-299264

[51] Int. Cl.6 .................................................... G06K 9/00
[52] U.S. Cl. ........................... 382/187; 382/197; 382/202; 382/179
[58] Field of Search .................................. 382/173, 177, 382/179, 186, 187, 190, 197, 202

[56] References Cited

U.S. PATENT DOCUMENTS

| | | | |
|---|---|---|---|
| 4,162,482 | 7/1979 | Su | 382/266 |
| 4,365,235 | 12/1982 | Greanias et al. | 382/24 |
| 4,542,526 | 9/1985 | Satoh et al. | 382/13 |
| 4,685,142 | 8/1987 | Ooi et al. | 382/13 |
| 4,718,102 | 1/1988 | Crane et al. | 382/187 |
| 4,979,226 | 12/1990 | Sato | 382/197 |
| 5,020,117 | 5/1991 | Ooi et al. | 382/24 |
| 5,034,989 | 7/1991 | Loh | 382/24 |
| 5,058,182 | 10/1991 | Kuan et al. | 382/187 |
| 5,187,480 | 2/1993 | Thomas et al. | 382/13 |

FOREIGN PATENT DOCUMENTS 3-175591  7/1991  Japan ............................... G06K 9/62

OTHER PUBLICATIONS

"Rough Classification Of Handwritten Kanji Characters", Y. Yamashita, OKI Technical Review, vol. 50–51, No. 7, 1985, pp. 140–147.

"On–line Recognition Of Handwritten Japanese Characters In JOLIS–1'", M. Nakagawa, et al., Proc. Pattern Recognition 1982, pp. 776–779.

"On–line Recognition Of Handwritten Chinese Characters: A Syntactic–Semantic Approach", Y. Juang, Proc., Tencon '87, vol. 1/3, pp. 91–95.

Primary Examiner—Leo Boudreau
Assistant Examiner—D. Richard Anderson, Jr.
Attorney, Agent, or Firm—Fitzpatrick, Cella, Harper & Scinto

[57] ABSTRACT

Character recognition method and apparatus according to the present invention comprises the partial pattern dictionary which classifies and registers partial patterns of characters to be recognized in accordance with direction data of strokes and the partial pattern composition dictionary which classifies and registers dictionary characters in accordance with the partial patterns. When a character image to be recognized is inputted, each stroke is converted into direction data. The partial pattern dictionary is searched by using the attained direction data and divides the character image to be recognized into a single or plurality of partial patterns. The partial pattern composition dictionary is searched by using the partial patterns attained in the above-described way. A dictionary character is thus attained as the result of recognition.

32 Claims, 10 Drawing Sheets

FIG. 4

| INPUT STROKE NUMBER | DIRECTION DATA |
|---|---|
| 1 | 2  2  2 |
| 2 | 4  4  4 |
| 3 | 5  5  5 |
| 4 | 3  3  3 |
| 5 | 4  4  4 |
| 6 | 2  4  4 |
| 7 | 2  2  2 |
| 8 | 2  2  2 |
| 9 | 2  2  2 |

FIG. 5

| DIRECTION DATA | FEATURE STROKE NUMBER |
|---|---|
| 0 0 0 | 0 |
| 0 0 1 | 1 |
| ⋮ | ⋮ |
| 2 2 2 | 4 0 |
| ⋮ | ⋮ |
| 2 4 4 | 4 8 |
| ⋮ | ⋮ |
| 3 3 3 | 6 6 |
| ⋮ | ⋮ |
| 4 4 4 | 8 5 |
| ⋮ | ⋮ |
| 5 5 5 | 1 0 2 |
| ⋮ | ⋮ |
| 7 7 7 | 1 7 0 |

FIG. 6

| INPUT STROKE NUMBER | FEATURE STROKE NUMBER |
|---|---|
| 1 | 4 0 |
| 2 | 8 5 |
| 3 | 1 0 2 |
| 4 | 6 6 |
| 5 | 8 5 |
| 6 | 4 8 |
| 7 | 4 0 |
| 8 | 4 0 |
| 9 | 4 0 |

FIG. 8

| LEADING PARTIAL PATTERN (81) | REST OF PARTIAL PATTERN (82) | CHARACTER CODE (83) |
|---|---|---|
| 肖 | NONE | 肖 |
| | ⋮ | ⋮ |
| | 刂 | 削 |
| ⋯⋯⋯⋯ | ⋯⋯⋯⋯ | ⋯⋯⋯⋯ |
| 木 | NONE | 木 |
| | ⋮ | ⋮ |
| | 彡 | 杉 |
| | ⋮ | ⋮ |
| | 目 | 相 |
| | ⋮ | ⋮ |
| | 冓 | 構 |
| | ⋮ | ⋮ |
| | 票 | 標 |
| | ⋮ | ⋮ |

5,579,408

CHARACTER RECOGNITION METHOD AND APPARATUS

This application is a continuation of application Ser. No. 07/976,376 filed Nov. 3, 1992, now abandoned.

BACKGROUND OF THE INVENTION

The present invention relates to a character recognition method and apparatus and, more particularly, to a character recognition method and apparatus which perform character recognition at real time based on input strokes of a character image.

The typical methods for recognizing a character image in a conventional apparatus are as following:

(1) Method utilizing the order of making strokes of a character image in writing and its figure;

(2) Method utilizing the positional relation of input strokes; and (3) Method analyzing the change of position of a stroke in a time sequence by Fourier transform.

In method (1), there is a problem when strokes of the character image to be recognized are inputted in wrong order. To cope with this problem, expected orders of strokes for characters which may be inputted in wrong order are registered in a dictionary, however, it has not been effective so far.

In method (2), there is the problem that it is difficult to define the positions of strokes of characters for numerous user.

In method (3), there is the problem that a wave is irregularly changed by effects of the order of strokes.

Furthermore, in these methods, when a plurality of character images are inputted, it is difficult to segment character images in an input apparatus which does not have a frame to define each of inputted character images.

SUMMARY OF THE INVENTION

Accordingly, it is an object of the present invention to provide a character recognition apparatus and method capable of stable recognition for changes caused by the order of input strokes and relative positions of the input strokes. It is the second object of the present invention to provide a character recognition apparatus and method capable of performing an automatic segmentation for a plurality of characters which are sequentially inputted.

According to the present invention, the foregoing object is attained by a character recognition apparatus comprising:

a partial pattern dictionary for registering partial patterns of a character image in a form of data indicating directions of strokes;

a partial pattern composition dictionary for registering a character image which is composed of a single or plurality of partial patterns;

input means for inputting strokes of the character image to be recognized;

first extraction means for extracting a single or plurality of partial patterns from the character image to be recognized by searching the partial pattern dictionary based upon the data indicating a direction of a stroke which is inputted by the input means;

second extraction means for extracting a pertinent character by searching the partial pattern composition dictionary with the partial pattern which is attained by the first extraction means; and output means for outputting the searched character which is attained by the second extraction means as the result of recognition.

According to the present invention, the foregoing object is further attained by a character recognition method comprising:

input step of inputting strokes of a character image to be recognized;

first extraction step of extracting a single or plurality of partial patterns from the character image to be recognized by searching a partial pattern dictionary which registers partial patterns of the character image in a form of data indicating directions of strokes based upon the data indicating a direction of the stroke which is inputted by the input step;

second extraction step of extracting a pertinent character by searching a partial pattern composition dictionary which registers the partial patterns and a character image comprising a plurality of partial patterns with the partial pattern which is attained by the first extraction step; and output step of outputting the searched character which is attained by the second extraction step as the result of recognition.

According to the above-described structure and steps, partial pattern data is discriminated and extracted regardless of the order of stroke input and positions. A character image which is inputted is separated into a single or plurality of partial patterns. Then, a pertinent character based on the extracted partial patterns is searched and outputted as the result of recognition.

Furthermore, in order to attain the second object, the character recognition apparatus comprises second extracting means for extracting a pertinent dictionary character including the partial patterns which are attained by the first extraction means at most.

According to the above-described structure, in the case where the plurality of character images to be recognized are sequentially inputted, an automatic segmentation can be performed on these character images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram illustrating the determined direction vectors for each stroke of the character "相" which is an example for an input of the present embodiment;

FIG. 5 is a diagram illustrating a data structure of a stroke dictionary of the present embodiment;

FIG. 6 is a diagram illustrating the result of feature stroke number extraction to "相" which is an example for an input of the present embodiment;

FIG. 8 is a diagram illustrating a partial pattern composition dictionary of the present embodiment;

DESCRIPTION OF THE PREFERRED EMBODIMENTS

Preferred embodiments of the present invention will now be described in detail in accordance with the accompanying drawings.

[First Embodiment]

Figure 12:
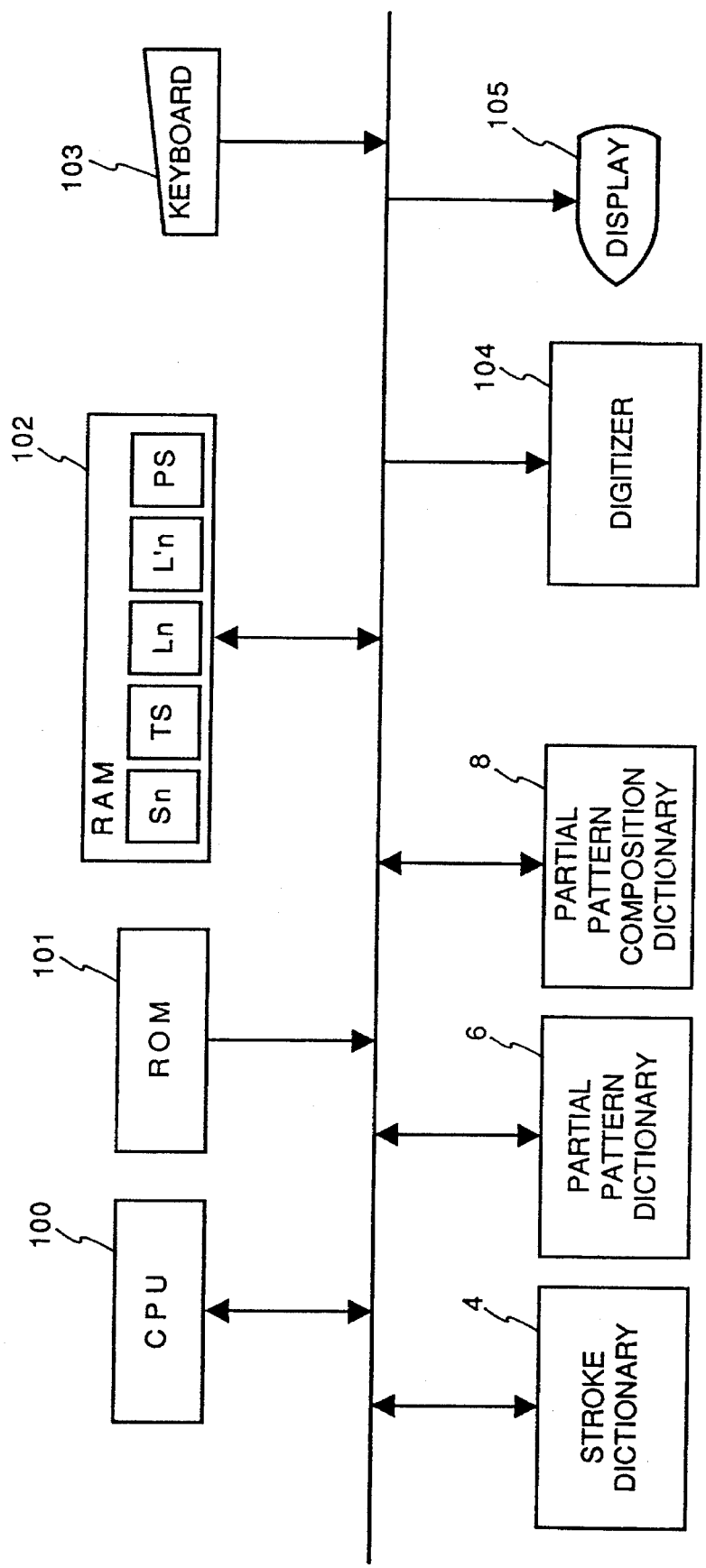
FIG. 12 is a diagram illustrating a structure of the character recognition apparatus of the first embodiment.

FIG. 12 is a diagram illustrating a structure of the character recognition apparatus of the present embodiment. In FIG. 12, numeral 100 is a CPU which executes various controls of the character recognition apparatus in accordance with control programs stored in a ROM 101. The control program which is described later is also stored in the ROM 101 and executed under the control of the CPU 100. Numeral 102 is a RAM having areas where data are temporary stored when the CPU 100 executes various controls. A keyboard 103 inputs various commands and data to the CPU 100. Numeral 104 is a digitizer. When a hand-written character image is inputted, strokes of the image are read as a string of coordinates data. Numeral 105 is a display which displays the result of recognition of the hand-written character image inputted from the digitizer 104.

Numeral 4 is a stroke dictionary where a feature stroke number and direction data are paired. The feature stroke is data on each of three vectors indicating a direction, which is obtained by dividing a stroke into three, and data on an order that each vector is inputted. The feature stroke number is a number which identifies each feature stroke. The direction data is data expressing an arrangement (combination) of three vectors indicating directions when each stroke is decomposed to three direction vectors (to be described later in FIG. 5).

Numeral 6 is a partial pattern dictionary where a partial pattern number and feature stroke data are paired. A partial pattern is a pattern comprising a part of the character image or whole character image which is defined by a single or plurality of feature strokes. A partial pattern number is a unique number which specifies each partial pattern. The feature stroke data is data expressing a partial pattern by feature stroke numbers (to be described later in FIG. 7).

Numeral 8 is a pattern composition dictionary which stores a number for specifying a character image (character code) and partial patterns comprising a character image in pair (to be described later in detail along with FIG. 8).

Figure 1:
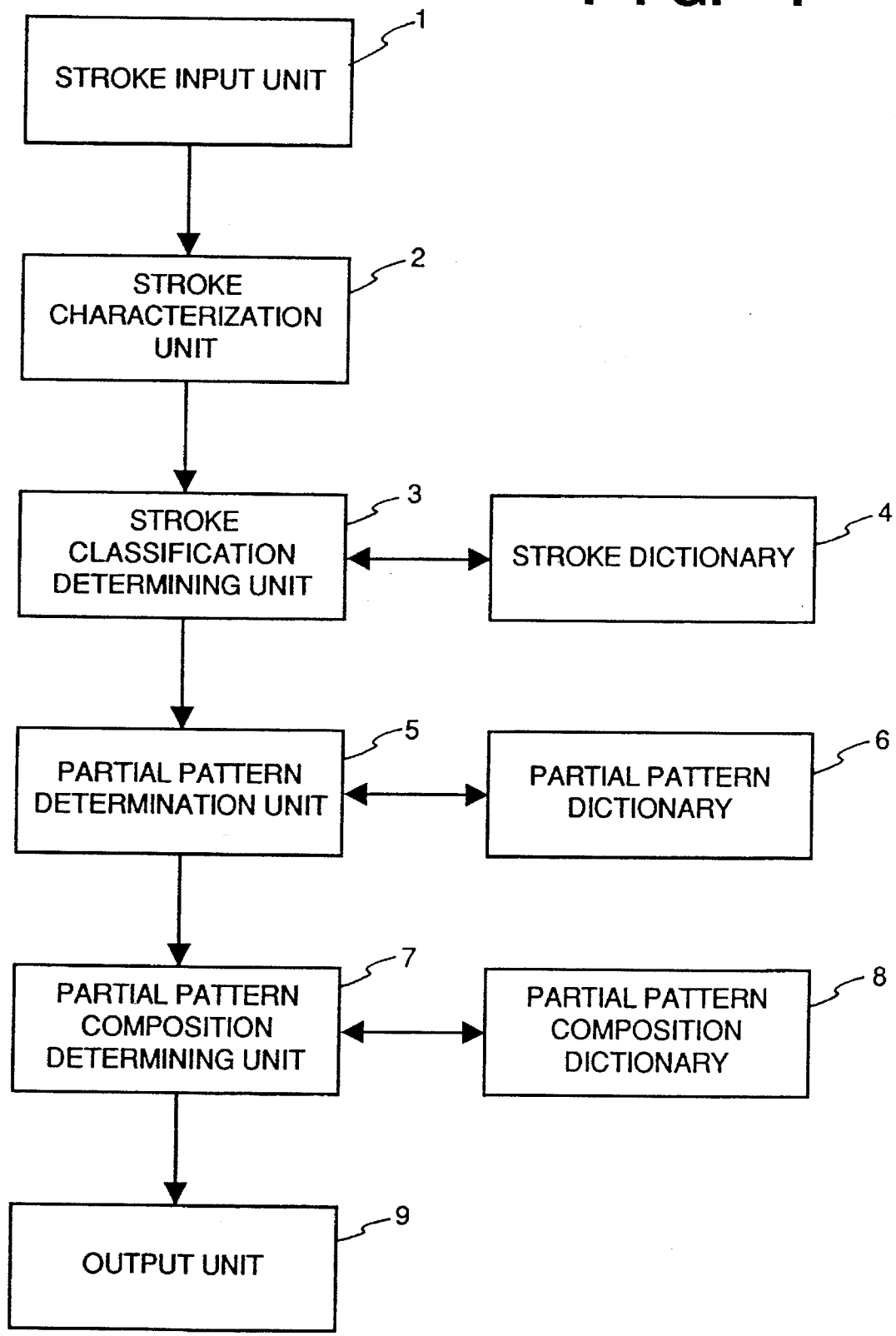
FIG. 1 is a block diagram illustrating a functional structure of the present embodiment.
Figure 9:
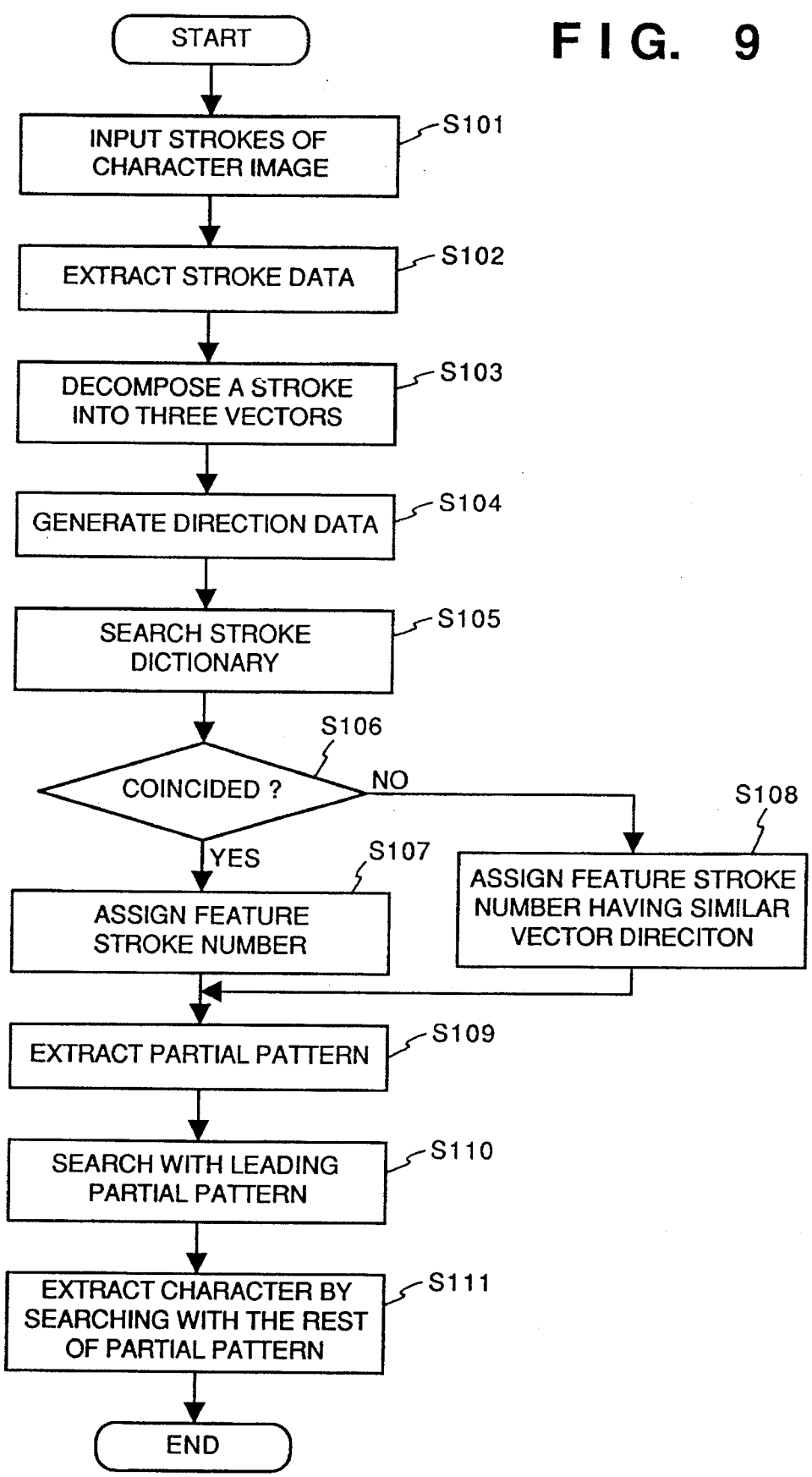
FIG. 9 is a flowchart illustrating a procedure for a character recognition processing of the present embodiment.

The operation of the character recognition apparatus is described along with FIGS. 1 and 9. FIG. 1 is a block diagram illustrating a functional structure and FIG. 9 is a flowchart illustrating a procedure for a character recognition processing in the character recognition apparatus of the present embodiment.

At step S101, when a character image to be recognized is inputted from a digitizer 104, each stroke of the character image is extracted at step S102. In the stroke input unit 1, while a stroke of a handwritten character image is inputted, sampling of coordinates where the pen point touches the input surface is performed at predetermined interval, and coordinates data is thus obtained for each point. In this way, a set of the coordinates data for the stroke is generated and stored in an area Sn which is reserved in a RAM 102. The set of coordinates data for a single stroke stored in the area Sn is referred to as "stroke data". In this way, the input unit 1 extracts strokes for a single character image which is inputted from the digitizer 104 and transfers to a stroke characterization unit 2.

At step S103, the stroke characterization unit 2 divides each stroke, which is expressed by the set of coordinates data, into three parts and each stroke is expressed by three vectors. At step S104, each direction vector is numbered to indicate one of eight directions as shown in FIG. 2.

Figure 2:
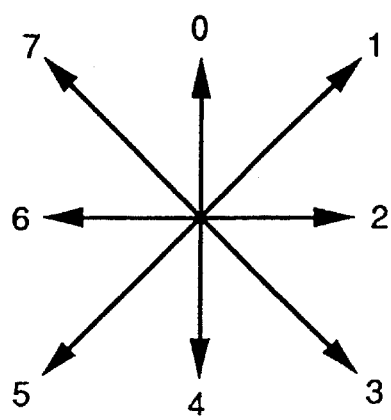
FIG. 2 is a diagram illustrating vectors indicating eight stroke directions of the present embodiment.
Figure 3:
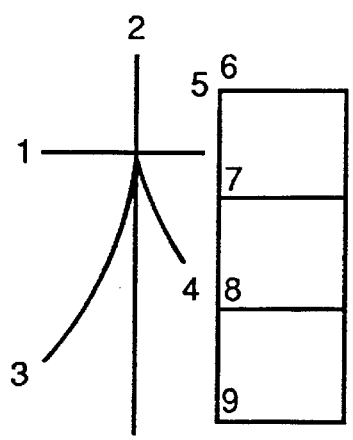
FIGS. 3(a) and 3(b) are diagrams illustrating a process to extract direction vectors of each stroke of the character "相" which is an example used as an input for the present embodiment.
Figure 3:
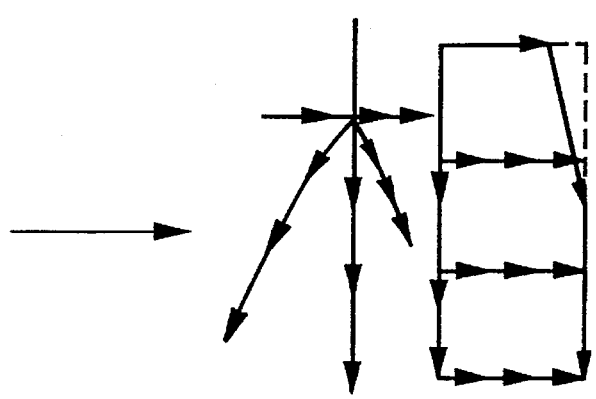

The processing in the stroke input unit 1 and stroke characterization unit 2 (steps S101–S104) are further described along with FIGS. 2–4.

FIG. 2 is a diagram showing the above-described eight directions which are respectively numbered. FIG. 3(a) is a diagram illustrating the processing for a stroke extraction in the stroke input unit 1 when the character "相" is inputted, for an example. The numbers 1 through 9 indicate the order of making strokes, that is, the input order. In the case of "相", the data on nine strokes are extracted and transferred to the stroke characterization unit 2.

As shown in FIG. 3(b), the stroke characterization unit 2 divides each stroke into three parts in accordance with the stroke data inputted from the stroke input unit 1 so as to be three vectors. Each vector attained by dividing the stroke is numbered to indicate a direction as shown in FIG. 2. Accordingly, three vector numbers respectively indicating a direction are given to each stroke. FIG. 4 is a table of the direction data which is a set of vector numbers for each stroke. These direction data are outputs of the stroke characterization unit 2.

In a stroke classification determining unit 3, the stroke dictionary 4 is searched based on the above direction data which is inputted from the stroke characterization unit 2. The stroke dictionary 4 stores the direction data and feature stroke number in pair. The direction data is converted to the feature stroke number with reference to the stroke dictionary 4 (steps S105, S106, and S107). FIG. 5 illustrates the contents registered in the stroke dictionary 4. The stroke dictionary 4 contains the feature stroke numbers of commonly used kanji (Chinese characters) (170 kinds in this embodiment).

In the case where the direction data which are transferred from the stroke characterization unit 2 are not completely matched with the data in the stroke dictionary 4, a feature stroke number having the most similar direction data is determined for the inputted stroke (S108). For example, in the case where one of the three vector numbers (direction) are not matched with the direction data in the stroke dictionary 4, a feature stroke number including a vector number which indicates the closest direction to the inputted data is selected. That is, in FIG. 2, the vector indicated by the direction number 4 is closest to the direction numbers 5 and 3.

In a partial pattern determination unit 5 of FIG. 1, a single or a plurality of partial patten numbers which coincide with the partial patterns registered in the partial pattern dictionary 6 are extracted based on the above feature stroke number (S109). The detail of the processing is described later along with the flowchart of FIG. 10.

Figure 7:
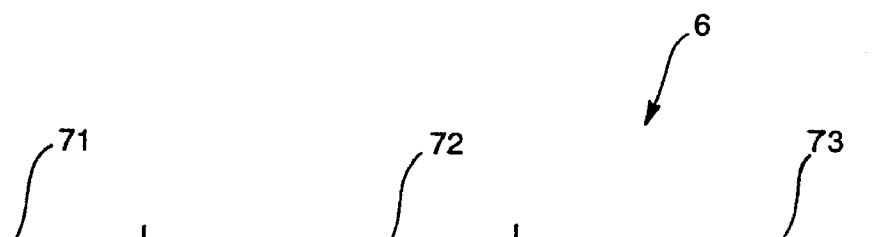
FIG. 7 is a diagram illustrating a data structure of a partial pattern dictionary of the present embodiment.

FIG. 7 is a data structure of the partial pattern dictionary 6. In the present embodiment, a partial pattern number (partial pattern numbers 71) which is comprised of a combination of at most seven feature stroke numbers (feature stroke data 73) can be registered. In FIG. 7, the data on the partial patterns indicated by numeral 72 are added for convenience sake, but are not actually included by the partial pattern dictionary 6. The number of the partial pattern number are arranged in numerical order as 1 ... 32 ... 58 ..., however, the feature stroke data corresponding to these numbers are arranged in the order from the data containing the feature stroke numbers at most. For example, the partial pattern number 1 corresponds to the feature stroke data having seven feature stroke numbers such as 40, 40, ..., 102 and the partial pattern number 58 corresponds to the feature stroke data having four feature stroke numbers such as 40, 66, 85, 102. As shown the feature stroke data 73, the feature stroke numbers included in each partial pattern are registered in an ascending order regardless of the stroke order.

For the character image "相", the partial patterns "木" and "目" (the partial patterns numbers 58 and 32) are extracted by the partial pattern discrimination unit 5 and outputted to the partial pattern composition determining unit 7.

In the partial pattern composition determining unit 7, a character code is attained as the result of recognition by searching the partial pattern composition unit 8 with the plurality of partial patterns.

FIG. 8 is a diagram illustrating an internal structure of the partial pattern composition dictionary 8. In FIG. 8, each partial pattern and character code are expressed by a character pattern, however, they are actually registered in the partial pattern code and code number. The leading partial patterns 81 includes a partial pattern which is first extracted from the all partial patterns included in the character image to be recognized by the partial pattern determination unit 5. To increase the speed in searching the dictionary and decrease the capacity of the dictionary, partial patterns are classified based on the leading partial pattern in the dictionary.

The partial patterns 82 (which are inputted after the leading partial pattern) show a combination of partial patterns which are extracted by the partial pattern determination unit 5. A single character image is comprised of a leading partial pattern (81) and other partial patterns (82). The character code 83 includes a code expressing a pertinent character comprising the above-described partial patterns. As mentioned above, a code is replaced by a character pattern in FIG. 8. In the partial patterns other than the leading partial pattern, a special code which is not used for the artial pattern numbers is given to "NONE". In this case, it is judged that only the leading partial pattern comprises a single character image and a pertinent character code is given.

Accordingly, in the partial pattern composition determining unit 7, the leading partial patterns 81 of the partial pattern composition dictionary 8 are searched by using the partial pattern (leading partial pattern) which is first extracted by the partial pattern determination unit 5 (step S110). The partial patterns (82) which are inputted after the leading partial pattern are searched in an area storing partial pattens which can be combined with the leading pattern.

In the above-mentioned example of "相", the leading partial pattern is "木" which is first extracted by the partial pattern discrimination unit 5. Since the other partial pattern is "目", the character code corresponding to "相" is attained in FIG. 8.

In this way, the character code of the recognition result to the input stroke can be attained and the character of the result is displayed at the output unit 9.

Figure 10:
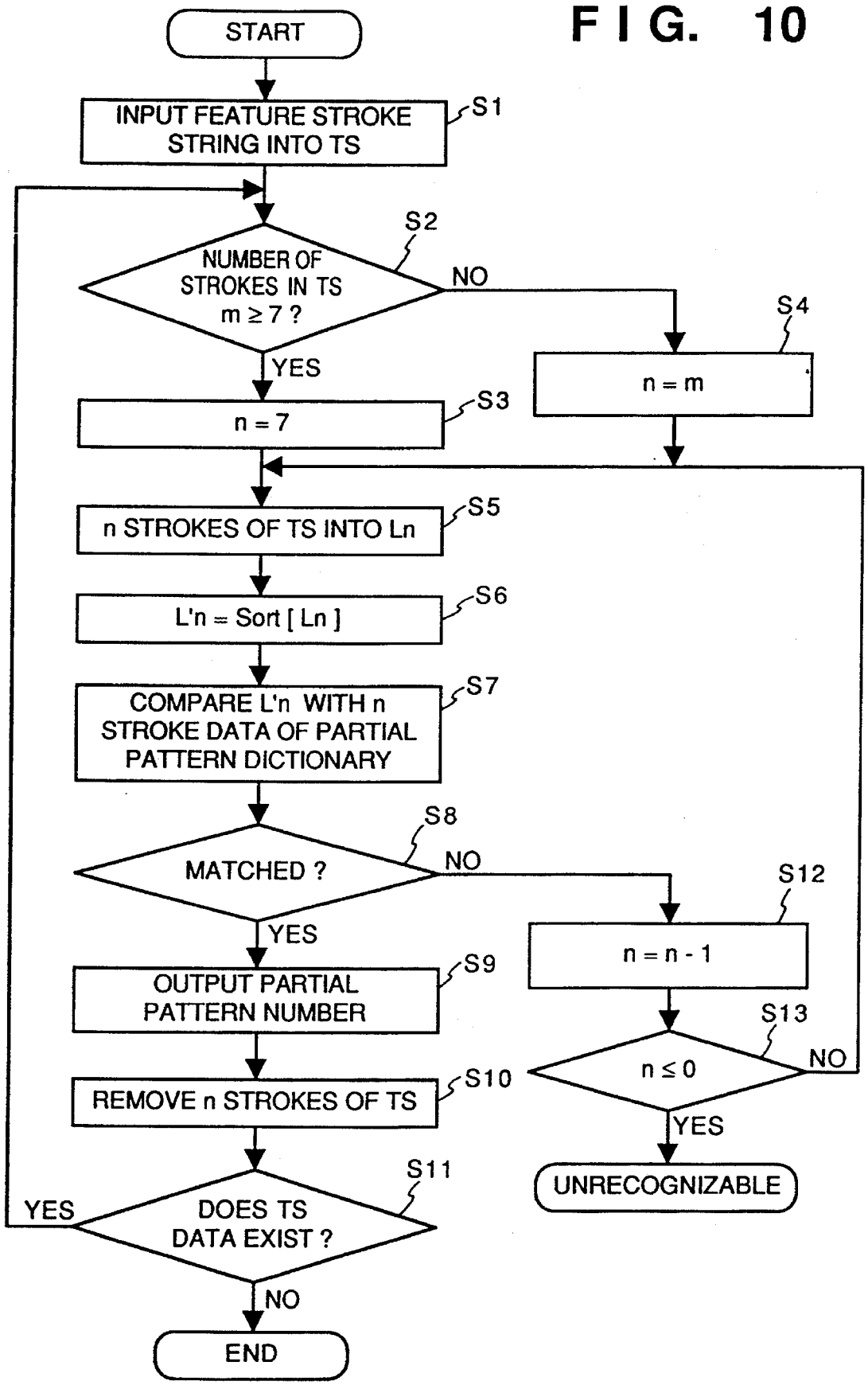
FIG. 10 is a flowchart illustrating a procedure for a partial pattern extraction processing in the present embodiment.

The processing of the operation of the partial pattern determination unit 5 is described in detail along with a flowchart of FIG. 10.

At step S1, a series of the all feature stroke numbers of inputted character images which are classified and discriminated by the stroke classification determining unit 3 are stored in a feature stroke storage buffer TS. The feature stroke storage buffer TS is an area reserved in the RAM 102. At step S2, whether or not the total of the feature stroke number m in the TS is larger than 7 is determined. In the case where m>7, n=7 is set at step S3. When m<7, m=n is set at step S4.

At step S5, n feature stroke numbers are extracted from the feature stroke storage buffer TS and stored in an area Ln which is reserved in the RAM 102. At step S6, n feature stroke numbers which are set at step S5 are rearranged in numerical order of the values and set in an area L'n which is reserved in the RAM 102. At step S7, the feature stroke data 73 of the partial pattern dictionary 6 and the area L'n are compared. As shown in FIG. 7, since the partial patterns in the partial pattern dictionary 6 are registered in the order from the partial patterns having the feature stroke numbers at most, only the area which stores the partial patterns comprising n feature stroke numbers can be searched. In this way, the comparison is sequentially performed and if a partial pattern which coincides with the input is found, the processing proceeds to step S9 from S8 and the pertinent partial pattern is transferred to the partial pattern composition determining unit 7.

In the case where n strokes are compared with the partial pattern including the feature stroke data and a matched partial pattern is not extracted, the processing is proceeds to step S12 from S8. At step S12, n is subtracted by one in order to reduce the number of stroke. If the result n is negative or zero, it is judged that it is impossible to recognize a partial pattern from step S13. In the case where n is positive, the process returns to step S5 and the above-mentioned processing is repeated. Since a matched partial pattern normally exists from $n^{th}$ to first stroke, the process proceeds to step S9 from S8.

When the processing at step S9 is completed, n strokes from the beginning from the buffer TS are removed in order to remove the strokes corresponding to a partial pattern which has been already attained at step S10. The processing of the partial pattern discrimination unit 5 is completed when the feature stoke of the TS is all removed. If remains, the process returns to step S2 from step S11 where the above-described processing is repeated. Thus, all feature strokes are extracted from the inputted character image.

Accordingly, the partial pattern of the inputted character image is determined by using the partial pattern dictionary 6 and partial pattern composition dictionary 8 and the inputted character image can be recognized stably by determining which partial patterns comprises the inputted character image. Furthermore, since the stroke order in the partial pattern does not have to depend on the order of the input stroke by rearranging the feature stroke numbers in the partial pattern dictionary, the recognition efficiency influenced by changes of the stroke order depending upon a user can be improved. According to the above-mentioned dictionary structure, an inputted character image can be recognized by searching the dictionary in a predetermined area, i.e., in a unit of partial pattern, without searching the all contents of the dictionary, resulting in a high speed character recognition. Even though the kinds of dictionaries are increased, memory size of the dictionary can be reduced in comparison with the conventional recognition method, since the capacity of each dictionary is small.

[Second Embodiment]

Figure 11:
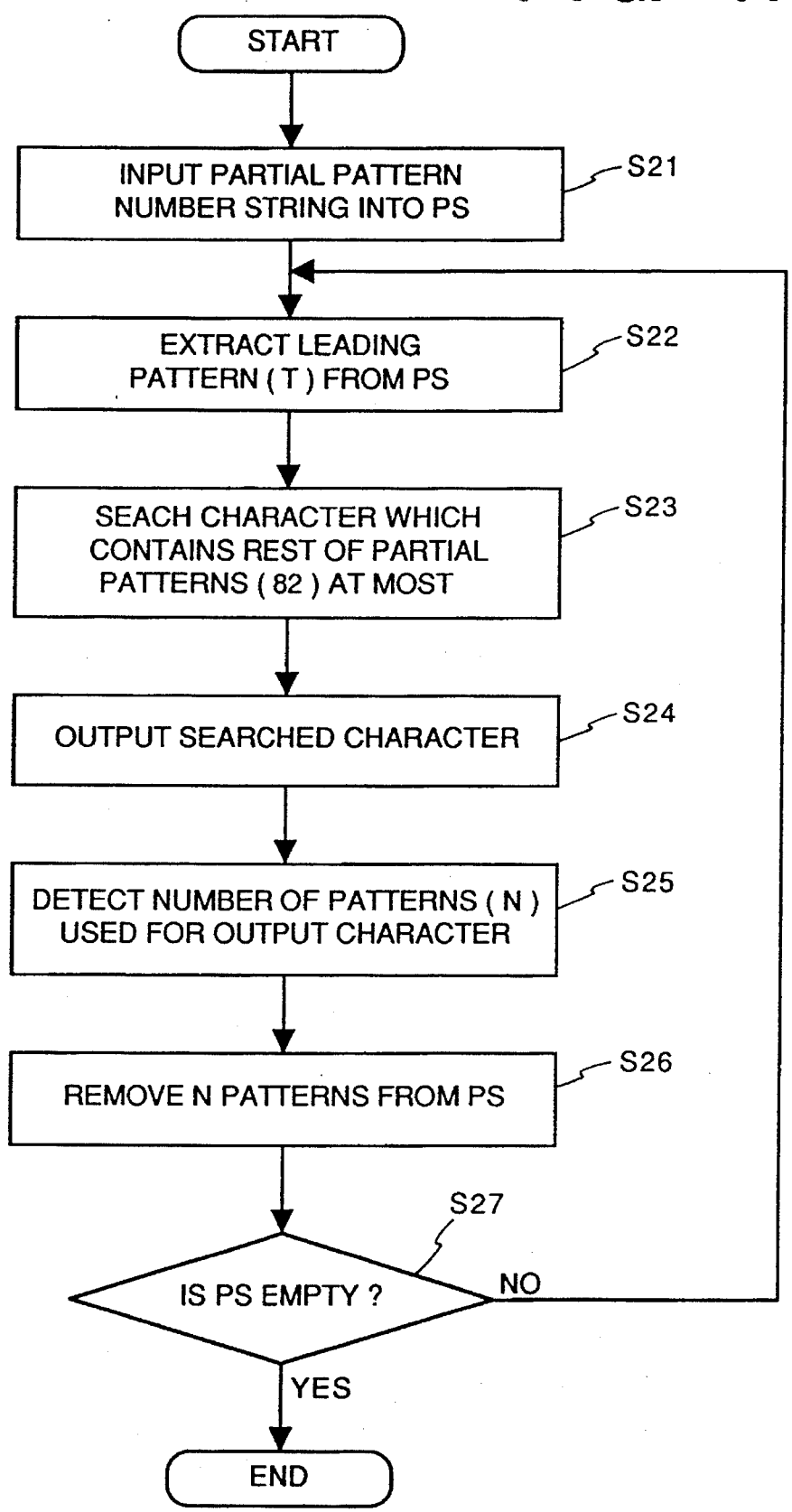
FIG. 11 is a flowchart illustrating a procedure for extracting a character image to be recognized in the second embodiment.

The character recognition apparatus 1 of the first embodiment extracts strokes for a character and performs a character recognition on each character one at a time based on feature of the strokes. The apparatus of the second embodiment differs from that of the first embodiment in segmentation of the characters which are sequentially inputted. The hardware structure of the apparatus in the second embodiment is the same as that of the first embodiment shown in FIG. 12. The functional structure of the apparatus in the second embodiment is also the same as that of the first embodiment shown in FIG. 1. However, the processing in the partial pattern composition determining unit 7 is modified in the second embodiment. The processing of the first embodiment is that the combination of the partial patterns transferred from the partial pattern determination unit 5 and that of the partial pattern composition dictionary 8 are compared and a matched combination is outputted as the result of recognition. While in the second embodiment, the character recognition apparatus which automatically segments inputted characters is provided. The character recognition processing in the partial pattern composition determining unit 7 is described along with a flowchart of FIG. 11.

At step S21, all partial pattern numbers which are transferred from the partial pattern determination unit 5 are inputted to a partial pattern composition buffer PS which is an area reserved in the RAM 102. At step S22, the partial pattern number first stored in the buffer PS is extracted. (Suppose that this partial pattern number is "T".) At step S23, the partial pattern number T, as a leading partial pattern, is compared with the data in the partial pattern composition dictionary 8. It is searched so as to coincide the partial patterns in the buffer PS following to the leading pattern whose number is T with the rest of partial patterns (82) inputted after the leading partial pattern in the partial pattern composition dictionary 8 at most. That is, the character code representing the character comprising the partial patterns which are registered in the buffer PS at most is searched. The character code which is searched in this way is outputted to the output unit 9 at step S24.

At step S25, the number of the partial pattern numbers which are used at step S24 is detected. If this is N, N partial patterns are removed from the buffer PS in the order of input at step S26. In the buffer PS, a vacancy caused by removing the partial patterns is filled by the following partial patterns. At step S27, it is judged whether or not all partial patterns are removed from the buffer PS, and if removed, the present processing is completed. If the data remains in the buffer PS, the process returns to step S22 where the above-described processing is repeated.

According to the above-described processing, an automatic segmentation of the inputted character images is enabled. For example, when "力", "口", and "エ" are sequentially inputted, the two characters of kanji, "加" and "エ" are recognized by the above-described processing.

In the above second embodiment, the apparatus automatically segments the character images, however, segmentation can be easily operated by a user. This can be realized when the arrangement for segmentation which is utilized in a Japanese word processor capable of inputting kana-kanji (Japanese syllabary-Chinese character) is provided, a boundary is indicated, and the search at step S23 is performed while the number of strokes is decreased. Take an example of the inputs "力", "口", and "エ". If a segmentation is set to between "口" and "エ", the two kanji characters, "加" and "エ" are recognized. If a segmentation is set to between "力" and "口", the three kanji characters, "力", "口", and "エ" are recognized.

As described above, efficiency of the character recognition is improved regardless of the changes of the input order and the positions of strokes depending on a user by providing the partial pattern composition dictionary of the partial patterns comprising each character. Since the information in the dictionaries is classified in detail and efficiency in condensation of the information is improved, the capacity for the dictionaries is reduced and high speed processing apparatus can be provided at low cast.

Furthermore, according to the method and apparatus of the present invention, stable character recognition can be performed regardless of the input order and the relative changes influenced by input strokes, and automatic segmentation can be performed on the sequentially inputted character images.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. A character recognition apparatus comprising:

a partial pattern dictionary for registering partial patterns of character images in a form of data indicating strokes, the data for each partial pattern are ordered in a predetermined rule which is independent of a stroke input sequence of a character image;

a partial pattern composition dictionary for registering character images which are composed of a single or a plurality of partial patterns;

input means for inputting strokes of a character image to be recognized;

obtaining means for obtaining data indicating strokes inputted by said input means;

sorting means for sorting the data obtained by said obtaining means in accordance with the predetermined rule;

first extraction means for extracting a single or plurality of partial patterns by searching said partial pattern dictionary based upon the data sorted by said sorting means;

second extraction means for extracting a pertinent character by searching said partial pattern composition dictionary with the partial pattern which is obtained by said first extraction means; and output means for outputting a result of character recognition based on the searched character which is obtained by said second extraction means.

2. The character recognition apparatus according to claim 1, wherein the inputting strokes in said input means is performed by a digitizer.

3. The character recognition apparatus according to claim 1, wherein said output means has a display which displays the result of the character recognition.

4. A character recognition apparatus comprising:

feature stroke dictionary for registering a combination of direction vectors of each stroke, which are obtained by dividing a single stroke into a predetermined number of parts, as a feature stroke;

partial pattern dictionary for registering partial patterns of a character image in a form of data indicating the feature strokes, the data for each partial pattern are ordered in a predetermined rule which is independent of a stroke input sequence of a character image;

partial pattern composition dictionary for registering character images which are composed of a single or a plurality of the partial patterns;

input means for inputting strokes of a character image to be recognized;

direction vector obtaining means for obtaining direction vectors for each stroke by dividing a stroke into the predetermined number of parts;

feature stroke obtaining means for obtaining data, each of which indicates pertinent feature stroke corresponding to the input stroke by searching said feature stroke dictionary with the combination of direction vectors which is obtained by said direction vector obtaining means;

sorting means for sorting the data obtained by said feature stroke obtaining means based on the predetermined rule;

first extraction means for extracting a single or a plurality of partial patterns by searching said partial pattern dictionary with the data sorted by said sorting means;

second extraction means for extracting a pertinent character by searching a partial pattern composition dictionary, said partial pattern composition dictionary registers character images comprising a single or plurality of partial patterns, with the partial which is obtained by said first extraction step; and output step of outputting a character recognition result based on the searched character which is obtained by said second extraction step.

5. The character recognition apparatus according to claim 4, wherein said input means inputs strokes of a character image to be recognized as a plurality of coordinate data by sampling points of the stroke at predetermined interval, and said direction vector obtaining means divides the stroke into the predetermined number of portions based on the coordinate data.

6. The character recognition apparatus according to claim 4, wherein said direction vector obtaining means obtains three direction vectors for each stroke by dividing each stroke into three parts.

7. The character recognition apparatus according to claim 4, wherein said first extraction means searches the partial pattern dictionary with the arranged order while the number of feature strokes is changed from a maximum number of a minimum number in order to extract a partial pattern which has the most feature strokes obtained by said feature stroke obtaining means.

8. The character recognition apparatus according to claim 4, wherein said partial pattern composition dictionary classifies each character in the dictionary based on a partial pattern of a character image first input in a process of stroke input and other partial patterns sequentially input after that, and registers these classified partial patterns, and said second extraction means searches said partial pattern composition dictionary by means of the partial pattern which is first extracted by said first extraction means based on the input order of the strokes and searches a pertinent character by using partial patterns other than the first extracted partial pattern.

9. The character recognition apparatus according to claim 4, wherein said second extraction means searches said partial pattern composition dictionary based on the partial pattern which is obtained by said first extraction means and extracts the character having the most number of partial patterns.

10. The character recognition apparatus according to claim 4, wherein the inputting strokes in said input means is performed by a digitizer.

11. The character recognition apparatus according to claim 4, wherein said output means has a display which displays the result of the character recognition.

12. A character recognition method comprising:

input step of inputting strokes of a character image to be recognized;

obtaining step of obtaining direction data indicating direction of strokes inputted by said input step;

arranging step of arranging the data obtained by said obtaining step in accordance with a predetermined rule which is independent of a stroke input sequence of a character image;

first extraction step of extracting a single or plurality of partial patterns of the character image by searching a partial pattern dictionary, said partial pattern dictionary registers partial patterns of character images in a form of data indicating strokes, the data for each partial pattern are ordered based on the predetermined rule based upon the data arranged by said arranging step;

second extraction step of extracting a pertinent character by searching a partial pattern composition dictionary, said partial pattern composition dictionary registers character images comprising a single or plurality of partial patterns, with the partial pattern which is obtained by said first extraction step; and output step of outputting a character recognition result based on the searched character which is obtained by said second extraction step.

13. The character recognition apparatus according to claim 12, wherein the inputting strokes in said input means is performed by a digitizer.

14. The character recognition method according to claim 12, wherein said output step displays the result of the character recognition on a display.

15. A character recognition method comprising:

input step of inputting a stroke of a character image to be recognized;

direction vector obtaining step of obtaining direction vectors for each stroke by dividing a stroke into a predetermined number of parts;

feature stroke obtaining step of obtaining data each of which indicates a pertinent feature stroke corresponding to the stroke inputted by said input step by searching a feature stroke dictionary which registers a combination of direction vectors of each stroke, which are obtained by dividing a single stroke into a predetermined number of parts, as a feature stroke with the combination of direction vectors which is obtained by said direction vector obtaining step;

sorting step of sorting the data obtained by said feature stroke obtaining step in accordance with a predetermined rule which is independent of a stroke input sequence of a character image;

first extraction step of extracting a single or plurality of partial patterns by searching a partial pattern dictionary, which registers partial patterns of a character image in a form of data which is ordered based on the predetermined rule, with feature strokes sorted by said sorting step;

second extraction step of extracting a pertinent character by searching a partial pattern composition dictionary which registers a character image which is composed of a single or plurality of the partial patterns with the partial pattern which is obtained by said first extraction step; and output step of outputting a result of character recognition based on the searched character which is obtained by said second extraction step.

16. The character recognition method according to claim 15, wherein said input step inputs strokes of a character image to be recognized as a plurality of coordinate data by sampling points of the stroke at predetermined interval, and said direction vector obtaining step divides the stroke into the predetermined number of portions based on the coordinate data.

17. The character recognition method according to claim 15, wherein said direction vector obtaining step obtains three direction vectors for each stroke by dividing each stroke into three parts.

18. The character recognition method according to claim 15, wherein said first extraction step searches the partial pattern dictionary with the arranged order while the number of feature strokes is changed from a maximum number to a minimum number in order to extract a partial pattern having the most feature strokes obtained by said feature stroke obtaining step.

19. The character recognition method according to claim 15, wherein said partial pattern composition dictionary classifies each character in the dictionary based on a partial pattern of a character image first input in a process of stroke input and other partial patterns sequentially input after that, and registers these classified partial patterns, and said second extraction step searches said partial pattern composition dictionary by means of the partial pattern which is first extracted by said first extraction step based on the input order of the strokes and searches a pertinent character by using partial patterns other than the first extracted partial pattern.

20. The character recognition method according to claim 15, wherein said second extraction step searches said partial pattern composition dictionary based on the order of the partial pattern which is obtained by said first extraction step and extracts the character including the most number of partial patterns.

21. The character recognition apparatus according to claim 15, wherein the inputting strokes in said input means is performed by a digitizer.

22. The character recognition method according to claim 15, wherein said output step displays the result of the character recognition on a display.

23. A character recognition apparatus comprising:

a pattern dictionary for registering reference data constituted by a plurality of direction data of a pattern, wherein the plurality of direction data are ordered in a predetermined rule which is independent of a stroke input sequence of a character image;

input means for inputting strokes;

direction obtaining means for obtaining direction data of the strokes input by said input means;

sorting means for sorting the direction data obtained by said direction obtaining means in accordance with said predetermined rule;

matching means for matching the sorted direction data with the reference data registered in the pattern dictionary wherein the matching is performed based on a sorted order;

output means for outputting a pattern corresponding to reference data which get high score in said matching means.

24. The character recognition apparatus according to claim 23, wherein said input means inputs strokes of a character image to be recognized as a plurality of coordinate data by sampling points of the stroke at predetermined intervals, and said direction obtaining means divides the stroke into the predetermined number of portions based on the coordinates data.

25. The character recognition apparatus according to claim 23, wherein said direction obtaining means obtains three direction vectors for each stroke by dividing each stroke into three parts.

26. The character recognition apparatus according to claim 23, wherein the inputting strokes in said input means is performed by a digitizer.

27. The character recognition method according to claim 23, wherein said output step displays the result of the character recognition on a display.

28. A character recognition method comprising:

input step of inputting strokes;

direction obtaining step of obtaining direction data of the strokes inputted in said input step;

sorting step of sorting direction data obtained in said direction obtaining step based on a predetermined rule which is independent of a stroke input sequence of a character image;

matching step of matching the stored direction data with reference data registered in a pattern dictionary, which registers the reference data composed of a plurality of direction data wherein the plurality of direction data are ordered based on the predetermined rule; and output step of outputting a pattern corresponding to reference data which get high score in said matching step.

29. The character recognition method according to claim 28, wherein said input step includes strokes of a character image to be recognized as a plurality of coordinate data by sampling points of the stroke at predetermined intervals, and said direction obtaining step divides the stroke into the predetermined number of portions based on the coordinate data.

30. The character recognition method according to claim 28, wherein said direction obtaining step obtains three direction vectors for each stroke by dividing each stroke into three parts.

31. The character recognition apparatus according to claim 28, wherein the inputting strokes in said input means is performed by a digitizer.

32. The character recognition method according to claim 28, wherein said output step displays the result of the character recognition on a display.

* * * * *

UNITED STATES PATENT AND TRADEMARK OFFICE
CERTIFICATE OF CORRECTION

PATENT NO. : 5,579,408

DATED : November 26, 1996

INVENTORS : Katsuhiko Sakaguchi, et al.

It is certified that error appears in the above-identified patent and that said Letters Patent is hereby corrected as shown below:

IN THE DRAWINGS

Sheet 7, FIG. 9, "DIRECITON" should read --DIRECTION--.
Sheet 9, FIG. 11, "SEACH" should read --SEARCH--.

COLUMN 1

Line 5, "Nov. 3," should read --Nov. 13,--.

COLUMN 5

Line 19, "shown" should read --shown with--; and
Line 53, "artial" should read --partial--.

COLUMN 6

Line 38, "is" (second occurence) should be deleted;
Line 39, "n is subtracted by one" should read --one is subtracted from n--; and
Line 52, "If" should read --if it--.

COLUMN 9

Line 42, "partial" (second occurence) should read --partial pattern--; and
Line 62, "of" (last occurence) should read --to--.

UNITED STATES PATENT AND TRADEMARK OFFICE
CERTIFICATE OF CORRECTION

PATENT NO. : 5,579,408

DATED : November 26, 1996

INVENTORS : Katsuhiko Sakaguchi, et al.

Page 2 of 2

It is certified that error appears in the above-identified patent and that said Letters Patent is hereby corrected as shown below:

COLUMN 10

Line 49, "apparatus" should read --method--.

COLUMN 11

Line 58, "apparatus" should read --method--.

COLUMN 12

Line 30, "method" should read --apparatus--; and
LIne 60, "apparatus" should read --method--.

Signed and Sealed this

Twenty-second Day of July, 1997

Attest:

BRUCE LEHMAN

Attesting Officer

Commissioner of Patents and Trademarks